US008919943B2

(12) United States Patent
Ikegami et al.

(10) Patent No.: US 8,919,943 B2

(45) Date of Patent: Dec. 30, 2014

(54) INK-JET RECORDING METHOD

(75) Inventors: Masayuki Ikegami, Atsugi (JP); Ikuo Nakazawa, Kawasaki (JP); Akira Kuriyama, Atsugi (JP); Taketoshi Okubo, Asaka (JP); Atsuhito Yoshizawa, Kawasaki (JP); Kenichi Iida, Kawasaki (JP); Shoji Koike, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 352 days.

(21) Appl. No.: 13/360,512

(22) Filed: Jan. 27, 2012

(65) Prior Publication Data

US 2012/0194621 A1 Aug. 2, 2012

(30) Foreign Application Priority Data

Feb. 1, 2011 (JP) ................................ 2011-019955

(51) Int. Cl.

| | |
|---|---|
| ***C09D 11/00*** | (2014.01) |
| ***B41J 2/155*** | (2006.01) |
| ***B41J 2/15*** | (2006.01) |
| ***B41M 5/00*** | (2006.01) |
| ***B41M 7/00*** | (2006.01) |

(52) U.S. Cl.

CPC .. *B41J 2/15* (2013.01); *B41J 2/155* (2013.01); *B41M 5/0023* (2013.01); *B41M 7/009* (2013.01)

USPC ........................................................ 347/100

(58) Field of Classification Search

USPC ........................................................ 347/100

See application file for complete search history.

(56) References Cited

U.S. PATENT DOCUMENTS

| | | | | |
|---|---|---|---|---|
| 4,723,129 | A | 2/1988 | Endo | |
| 4,740,796 | A | 4/1988 | Endo | |
| 2009/0233068 | A1* | 9/2009 | Irita | 428/211.1 |
| 2009/0239044 | A1* | 9/2009 | Habashi et al. | 428/195.1 |
| 2012/0033011 | A1* | 2/2012 | Ohya et al. | 347/20 |

FOREIGN PATENT DOCUMENTS

| | | | | |
|---|---|---|---|---|
| JP | 2004-238445 A | | 8/2004 | |
| JP | 2006-89735 A | | 4/2006 | |
| JP | 2009-515007 A | | 4/2009 | |
| WO | WO 2010123064 A1 | * | 10/2010 | C09D 11/00 |

* cited by examiner

*Primary Examiner* — Laura Martin

(74) *Attorney, Agent, or Firm* — Canon U.S.A. Inc., IP Division

(57) ABSTRACT

Aspects of the present invention provide an ink-jet recording method including the step of applying an ink to a recording medium by discharging the ink from a recording head by action of thermal energy and the step of fixing the ink to the recording medium by heating the ink applied to the recording medium. The ink contains water, a self-dispersing pigment, and resin particles. The resin particles have a glass transition temperature of not less than 25° C., an average particle diameter of 70 nm or more and 220 nm or less, and an acid value of 25 mg KOH/g or more and 150 mg KOH/g or less.

8 Claims, 4 Drawing Sheets

INK-JET RECORDING METHOD

BACKGROUND OF THE INVENTION

1. Field of the Invention

The present invention relates to an ink-jet recording method.

2. Description of the Related Art

In recording images formed on recording media by an ink-jet recording method, improvement in fastness property such as marker resistance and scratch resistance is required. Against these requirements, it is known to enhance fastness property by adding resin particles to an ink. The addition of the resin particles can increase the binding property between a coloring material and a recording medium or between coloring materials and thereby can enhance fastness property. Japanese Patent Laid-Open No. 2004-238445 describes an ink that contains resin particles having a particle diameter 1 to 1.5 times that of pigment particles and is thereby improved in reliability, such as a decrease in clogging of the ink in a recording apparatus.

However, since the ink described in Japanese Patent Laid-Open No. 2004-238445 contains resin particles, the dispersion stability of the ink is insufficient in some cases. Furthermore, in the case where the ink is used in an ink-jet recording method (thermal ink-jet recording method), which is a system for performing recording by discharging an ink from a recording head and letting the ink fly by action of thermal energy, the discharge of the ink may be unstable. This is probably caused by that deposits are formed on a thin film resistor in the recording head due to an increase in viscosity by adding the resin particles to the ink or heat generated by applying a pulse to the ink.

That is, in order to stably discharge an ink by the thermal ink-jet recording method, it is required to inhibit the increase in the viscosity of ink containing resin particles. Furthermore, the ink is required to have abilities of forming bubbles with a desired volume in a recording head and of repeating foaming and defoaming in a desired time.

SUMMARY OF THE INVENTION

Accordingly, aspects of the present invention provide an ink-jet recording method that can impart high scratch resistance to a recording image formed thereby and can stably discharge ink even in a thermal ink-jet recording system.

The above-mentioned problems can be solved by aspects of the present invention described below. That is, aspects of the present invention relate to an ink-jet recording method including the step of applying an ink to a recording medium by discharging the ink from a recording head by action of thermal energy and the step of fixing the ink to the recording medium by heating the ink applied to the recording medium, wherein the ink contains water, a self-dispersing pigment, and resin particles. The resin particles have a glass transition temperature of not less than 25° C., an average particle diameter of 70 nm or more and 220 nm or less, and an acid value of 25 mg KOH/g or more and 150 mg KOH/g or less.

According to aspects of the present invention, an ink-jet recording method is provided that can impart scratch resistance to a recording image formed thereby and can stably discharge ink even by a thermal ink-jet recording method.

Further features of the present invention will become apparent from the following description of exemplary embodiments with reference to the attached drawings.

DESCRIPTION OF THE EMBODIMENTS

Figure 1:
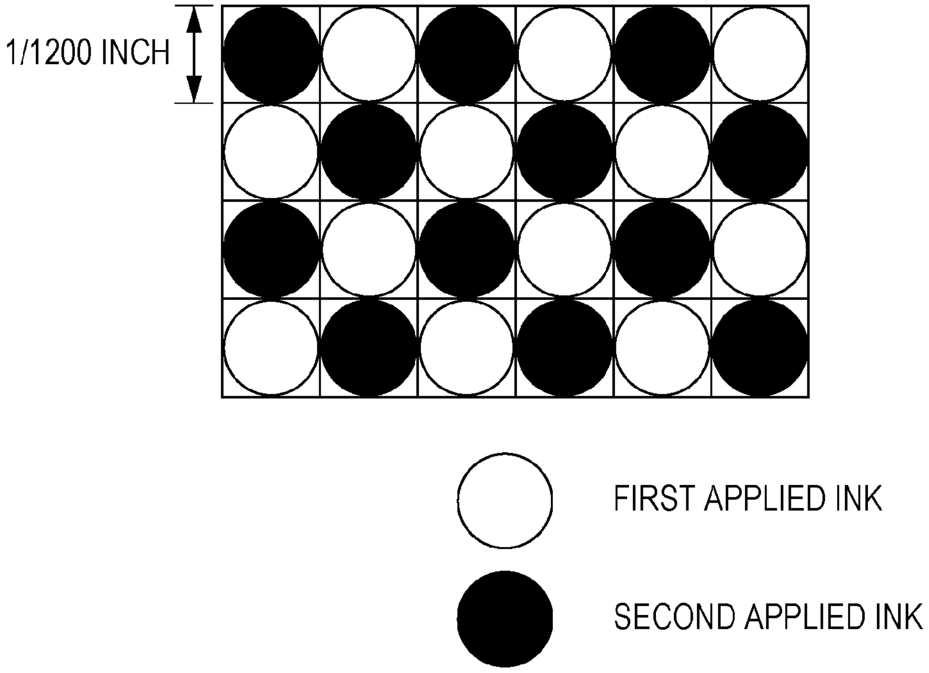
FIG. 1 is a diagram illustrating an example of a method forming recording dots.

The present invention will now be described in more detail with reference to preferred embodiments.

Ink

Coloring Material

The ink that is used in the ink-jet recording method of according to aspects of the present invention contains a self-dispersing pigment as a coloring material. According to aspects of the present invention, the self-dispersing pigment is used, and thereby satisfactory water resistance is provided. In addition, the use of the self-dispersing pigment accelerates solid-liquid separation after landing of ink on a recording medium, resulting in enhancement of color-developing ability. Furthermore, the self-dispersing pigment in the ink and conditions, which will be described below, for application of the ink synergistically function to smoothly achieve solid-liquid separation, compared to, for example, the case where a pigment of a resin dispersion system is used. Consequently, the pigment itself hardly penetrates deeply into the inside of the recording medium, providing a very good color-developing property.

In the self-dispersing pigment, a hydrophilic group is introduced to the pigment surface directly or through another atomic group, and thereby the pigment can be stably dispersed basically without requiring dispersants. As the pigment that has not been yet provided with stable dispersing ability, any known pigment, for example, those listed in WO2009/014242, can be used. The hydrophilic group to be introduced to such a pigment as a raw material for the self-dispersing pigment may be directly bound to the pigment surface or may be indirectly bound to the pigment surface with another atomic group between the pigment surface and the hydrophilic group.

In the self-dispersing pigment in which an acidic functional group is bound to the surface directly or through an atomic group, the acidic functional group is converted into an anionic hydrophilic group by dissociation of a proton at a specific pH. As a result, the pigment is stably dispersed in an ink without using a dispersant such as a resin or a surfactant. Examples of the anionic hydrophilic group include —$PO_3(M)_2$, —COOM, and —$SO_3M$ (in the formulae, M represents a hydrogen atom, an alkali metal, ammonium, or an organic ammonium). Specific examples of the alkali metal represented by "M" in the hydrophilic group include Li, Na, K, Rb, and Cs. Specific examples of the organic ammonium include methylammonium, dimethylammonium, trimethylammonium, ethylammonium, diethylammonium, triethylammonium, monohydroxymethyl(ethyl)amine, dihydroxymethyl(ethyl)amine, and trihydroxymethyl(ethyl)amine.

Specific examples of the atomic group intervening between the pigment surface and the hydrophilic group include linear or branched alkylene groups having 1 to 12 carbon atoms, substituted or unsubstituted phenylene groups, and substituted or unsubstituted naphthylene groups.

Examples of the substituents of the phenylene and naphthylene groups include linear or branched alkyl groups having 1 to 6 carbon atoms.

Specific examples of the self-dispersing pigment contained in the ink according to aspects of the present invention include self-dispersing pigments having surfaces modified with functional groups having a plurality of phosphonic acid groups, for example, those disclosed in PCT Japanese Translation Patent Publication No. 2009-515007, and self-dispersing pigments having surfaces modified with hydrophilic groups represented by —COOM (in the formula, M represents a hydrogen atom, an alkali metal, ammonium, or an organic ammonium), for example, those disclosed in Japanese Patent Laid-Open No. 2006-89735.

The average particle diameter of the self-dispersing pigment contained in the ink according to aspects of the present invention is determined by a dynamic light scattering method in a liquid and may be 60 nm or more, such as 70 nm or more, and even 75 nm or more and may be 145 nm or less, such as 140 nm or less, and even 130 nm or less. Throughout the specification, the term "average particle diameter" refers to light scattering average diameter. The average particle diameter can be measured utilizing scattering of laser beams with, for example, FPAR-1000 (manufactured by Otsuka Electronics Co., Ltd., cumulant analysis) or Nanotrac UPA 150EX (manufactured by Nikkiso Co., Ltd., measured as a 50% cumulative value). Examples of such a self-dispersing pigment include "COJ" (trademark), which is a self-dispersing pigment manufactured by Cabot Corp., and "CW" (trademark), which is a self-dispersing pigment manufactured by Orient Chemical Industries Co., Ltd.

The ink may optionally contain two or more types of self-dispersing pigments. The content of the self-dispersing pigment in the ink may be 0.5% by mass or more, such as 1.0% by mass or more, and even 2.0% by mass or more and may be 15.0% by mass or less, such as 10.0% by mass or less, and even 8.0% by mass or less, based on the total amount of the ink.

In the case where a color image is formed using a plurality of inks, a basic ink set is composed of black, cyan, magenta, and yellow inks and may further optionally contain, for example, red, blue, green, gray, light cyan, or light magenta ink. The coloring materials contained in these inks can be also self-dispersing pigments.

Resin Particles

The ink used in the ink-jet recording method according to aspects of the present invention contains resin particles. The resin particles used according to aspects of the present invention have a glass transition temperature of not less than 25° C., an average particle diameter of 70 nm or more and 220 nm or less, and an acid value of 25 mg KOH/g or more and 150 mg KOH/g or less.

Specific examples of the resin particles used according to aspects of the present invention include acrylic resins, methacrylic resins, styrene resins, urethane resins, acrylamide resins, epoxy resins, and ester resins. These resins can be used as copolymers. The structures of the resin particles may be either a single-phase structure or a multi-phase structure (core-shell type).

The resin particles used according to aspects of the present invention can be formed by emulsion polymerization or soap-free polymerization of an unsaturated monomer and can be present in an emulsion form in the ink. Such an emulsion is, for example, an acrylic emulsion. This can avoid insufficient dispersion of resin particles in the case where the resin particles are added to an ink in a dried powder form. An emulsion formed by polymerization of a vinyl monomer can be used from the viewpoint of storage stability of the ink.

The emulsion of the resin particles can be produced by known emulsion polymerization, for example, by soap-free emulsion polymerization of a hydrophobic monomer and a hydrophilic monomer using an initiator. Examples of the hydrophobic monomer include styrene, α-methylstyrene, and methyl methacrylate. Examples of the hydrophilic monomer include styrene sulfonic acid, vinyl toluene sulfonic acid, 2-acrylamide-2-methylpropanesulfonic acid, propane sulfonic acid, acrylic acid, methacrylic acid, itaconic acid, fumaric acid, acrylonitrile, acrylamide, 4-vinylpyridine, N,N-dimethylaminoethyl methacrylate, and N,N-dimethylaminoethyl methacrylate monoester of maleic acid. Examples of the initiator include potassium persulfate.

Alternatively, the resin particles can be prepared by emulsion polymerization of a monomer in water in the presence of a polymerization initiator. Specific examples of the monomer include carboxylic acid monomers such as acrylic acid, methacrylic acid, itaconic acid, fumaric acid, and maleic acid; sulfonic acid monomers such as 3-sulfopropyl(meth)acrylate, vinylstyrene sulfonic acid, and 2-acrylamide-2-methylpropane sulfonic acid; acrylic acid ester monomers such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, phenoxyethyl acrylate, and 2-hydroxyethyl acrylate; methacrylic acid ester monomers such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, phenoxyethyl methacrylate, 2-hydroxyethyl methacrylate, polyethylene glycol monomethacrylate, and polypropylene glycol methacrylate. Furthermore, examples of the monomer include cross-linkable monomers having two or more polymerizable double bonds. Specific examples of such monomers include diacrylate compounds such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropoxyphenyl)propane, 2,2'-bis(4-acryloxydiethoxyphenyl)propane, and N,N'-methylenebisacrylamide; triacrylate compounds such as trimethylolpropane triacrylate, trimethylolethane triacrylate, and tetramethylolmethane triacrylate; tetraacrylate compounds such as ditrimethylol tetraacrylate, tetramethylolmethane tetraacrylate, and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylolpropane trimethacrylate and trimethylolethane trimethacrylate; methylenebisacrylamide; and divinylbenzene.

Furthermore, examples of the monomer include monomers copolymerizable with the above-mentioned monomers. Specific examples of such monomers include aromatic vinyl monomers such as styrene, α-methylstyrene, vinyltoluene, 4-t-butylstyrene, chlorostyrene, vinylanisole, and vinylnaphthalene; olefins such as ethylene and propylene; dienes such as butadiene and chloroprene; vinyl monomers such as vinyl ether, vinyl ketone, and vinylpyrrolidone; acrylamides such as acrylamide, methacrylamide, and N,N'-dimethyl acrylamide; and monomers having hydroxyl groups such as 2-hydroxyethyl acrylate, 2-hydroxypropyl acrylate, 2-hydroxyethyl methacrylate, and 2-hydroxypropyl methacrylate.

As the polymerization initiator, those that are usually used in radical polymerization can be used. For example, potassium persulfate or 2,2'-azobis(2-amidinopropane)dihydrochloride can be used. In addition to the polymerization initiator, for example, a surfactant, a chain-transfer agent, or a neutralizer may be used in accordance with a usual method. As the neutralizer, ammonia or a hydroxide of an inorganic alkali such as sodium hydroxide or potassium hydroxide can be used. As the surfactant, for example, in addition to sodium lauryl sulfate, those generally used as anionic surfactants, nonionic surfactants, or amphoteric surfactants can be used. Examples of the chain-transfer agent that is used polymerization include t-dodecyl mercaptan, n-dodecyl mercaptan, n-octyl mercaptan, xanthogens such as dimethyl xanthogen disulfide and diisobutyl xanthogen disulfide, dipentene, indene, 1,4-cyclohexadiene, dihydrofuran, and xanthene.

The glass transition temperature of the resin particles used according to aspects of the present invention is not less than 25° C., such as not less than 35° C. and not higher than 120° C. The temperature of 25° C. is that assumed as the average temperature of indoor environment. A resin having a glass transition temperature of higher than this temperature shows a glass state in room temperature environment. In the ink-jet recording method according to aspects the present invention, the ink applied to a recording medium is heated. By this heating, a film of the resin particles having a high glass transition temperature can be formed, though the resin particles are not formed into a film in room temperature environment. The film formed of the resin particles sufficiently binds between the self-dispersing pigments and the recording medium to increase the scratch resistance of a recording image to be formed. If the glass transition temperature is lower than 25° C., the strength of a recording image to be formed by heating may be too low to provide sufficiently high scratch resistance. In addition, if the glass transition temperature is lower than 25° C., the ink may hardly penetrate into the inside of the recording medium so that the recording image maintains the adhesiveness of the resin. If the glass transition temperature is higher than 120° C., heating of the ink applied to a recording medium may require high thermal energy or may not be sufficiently formed into a film. Incidentally, according to aspects of the present invention, the glass transition temperature (Tg) can be measured by a usual method, for example, by a method using a thermal analyzer, such as a differential scanning calorimeter (DSC).

The average particle diameter of the resin particles used according to aspects of the present invention is 70 nm or more and 220 nm or less, such as 80 nm or more, and even 100 nm or more and such as 210 nm or less, and even 200 nm or less. The average particle diameter of the resin particles is measured utilizing scattering of laser beams with, for example, FPAR-1000 (manufactured by Otsuka Electronics Co., Ltd., cumulant analysis) or Nanotrac UPA 150EX (manufactured by Nikkiso Co., Ltd., measured as a 50% cumulative value). According to aspects of the present invention, the average particle diameter of the resin particles refers to 50% particle diameter (D50) based on volumetric distribution.

The acid value of the resin particles used according to aspects of the present invention is 25 mg KOH/g or more and 150 mg KOH/g or less, such as 140 mg KOH/g or less. The acid value is expressed as the amount (mg) of KOH required to neutralize 1 g of the resin. The acid value can be also calculated from the composition ratio of each monomer constituting the resin particles. Specifically, the acid value is measured by potentiometric titration using Titrino (manufactured by Metrohm Ltd.).

In the ink-jet recording method according to aspects of the present invention, an ink is fixed to a recording medium by heating. When the resin particles have a glass transition temperature, an average particle diameter, and an acid value within the ranges defined according to aspects of the present invention, the scratch resistance of a recording image can be increased and the discharge stability in a thermal ink-jet recording method can be increased. It is believed that the glass transition temperature, the average particle diameter, and the acid value of the resin particles synergistically contribute to achieve this. The film strength of the resin film formed of the resin particles highly contribute to the scratch resistance. According to aspects of the present invention, in order to form a resin film having a high strength, resin particles having a glass transition temperature of 25° C. or more are formed into a film. By forming a film of the resin particles having a glass transition temperature of 25° C. or more, the self-dispersing pigment is bound to the recording medium, improving the scratch resistance of a recording image.

The film-forming property of the resin particles depends on the minimum film forming temperature (MFT) of the resin particles. The minimum film forming temperature generally depends on the glass transition temperature and the particle diameter of resin particles, and resin particles having a smaller particle diameter tend to readily form a film. Accordingly, in the case of resin particles having a high glass transition temperature as in aspects of the present invention, a smaller particle diameter of the resin particles is desired. However, resin particles having a small average particle diameter tend to decrease the discharge stability in a thermal ink-jet recording method. Against this conflict phenomena between the film-forming property of resin particles and the discharge stability in a thermal ink-jet recording method, the present inventors have found that high film-forming property and discharge stability can be simultaneously achieved by controlling the average particle diameter and the acid value of the resin particles to 70 nm or more and 220 nm or less and 25 mg KOH/g or more and 150 mg KOH/g or less, respectively. The present inventors have also found that the resin particles tend to remain on the surface of a recording medium by increasing the average particle diameter of the resin particles, causing more effective expression of the binder function and increasing the scratch resistance.

Resin particles having a larger average particle diameter may work against forming of a film so as to prevent a sufficient improvement in scratch resistance or a reduction in dispersion stability. The present inventors have found that the above-described plurality of problems can be solved by adjusting the average particle diameter of the resin particles to 70 nm or more and 220 nm or less. In addition, the acid value of the resin particles is involved in the plurality of problems. If the acid value is too low, the dispersion stability of the resin particles may be deteriorated, or the discharge stability in the thermal ink-jet recording method may be decreased. Contrarily, if the acid value is too high, though the dispersion stability of the resin particles is satisfactory, the viscosity of the ink increases, which may decrease discharge stability. The present inventors have found that the plurality of problems can be solved by adjusting the acid value of the resin particles to 25 mg KOH/g or more and 150 mg KOH/g or less. The inventors have also found that ion clusters are formed by ionic functional groups of the resin particles and counter ions thereof during formation of a film of the resin particles by adjusting the acid value of the resin particles to 25 mg KOH/g or more and 150 mg KOH/g or less, and thereby the film can be more firmly formed, resulting in an increase in scratch resistance.

As described above, the present inventors have found that the glass transition temperature, the average particle diameter, and the acid value of resin particles synergistically act on the film-forming property and on discharge stability and also have found optimum numerical value ranges thereof.

The weight-average molecular weight (Mw) of the resin particles used according to aspects of the present invention is 50,000 to 50,000,000 from the viewpoints of discharge stability and scratch resistance and may be 100,000 or more, such as 200,000 or more and may be 25,000,000 or less, such as 10,000,000 or less. A weight-average molecular weight of the resin particles of smaller than 50,000 may not sufficiently improve the scratch resistance. Contrarily, a weight-average molecular weight of larger than 50,000,000 may decrease the discharge stability in the thermal ink-jet recording method. Incidentally, the weight-average molecular weight according to aspects of the present invention is the value measured by gel permeation chromatography (GPC), which utilizes excluded volumes of molecules as the separation principle.

The resin particles according to aspects of the present invention may be mixed with other components of an ink in a dried powder form, but from the viewpoint of dispersion stability of the resin particles, the resin particles are dispersed in an aqueous medium into an emulsion form (polymer emulsion) and are then mixed with other components of an ink.

The ink according to aspects of the present invention contains a self-dispersing pigment and resin particles, and binding of the self-dispersing pigment and a recording medium by the resin particles increases the scratch resistance. Accordingly, the content of the resin particles in an ink is 10.0% by mass or more, such as 20.0% by mass or more, based on the content of the self-dispersing pigment. If the content of the resin particles is less than 10.0% by mass based on the content of the self-dispersing pigment, the functional expression of the scratch resistance may be deteriorated. In addition, the content of the resin particles in an ink according to aspects of the present invention is 30.0% by mass or less, such as 20.0% by mass or less, based on the total amount of the ink. A content of larger than 30.0% by mass may increase the viscosity of the ink to make discharge of the ink difficult.

The ink according to aspects of the present invention may further contain resin particles having a glass transition temperature of less than 25° C. In such a case, the content of the resin particles having a glass transition temperature of less than 25° C. is one-tenth or less of the mass of the resin particles having a glass transition temperature of not less than 25° C. according to aspects of the present invention, from the viewpoint of expression of effect according to aspects of the present invention. From the viewpoint of discharge stability in the thermal ink-jet recording method, the average particle diameter of the resin particles having a glass transition temperature of less than 25° C. is 80 nm or more and 220 nm or less, such as 100 nm or more, and even 120 nm or more and such as 210 nm or less, and even 200 nm or less. From the viewpoint of discharge stability in the thermal ink-jet recording method, the acid value of the resin particles having a glass transition temperature of less than 25° C. is 25 mg KOH/g or more and 150 mg KOH/g or less, such as 140 mg KOH/g or less.

Production Example of Resin Particles

An example of production of resin particles will be described below. A predetermined amount of a monomer and 100 g of distilled water serving as a solvent are weighed in a 300-mL four-neck flask. A stirrer seal, a stirring rod, a reflux condenser, a septum rubber, and a nitrogen-inlet tube are attached to the flask, and replacement by nitrogen is performed in a thermostat bath of 70° C. with stirring at 300 rpm for 1 hr. Subsequently, a polymerization initiator dissolved in 100 g of distilled water is poured into the flask using a syringe to start polymerization. The state of the polymerization is monitored by gel permeation chromatography and nuclear magnetic resonance (NMR) to obtain a desired polymerization product. The produced resin particles are collected by centrifugation and redispersed in distilled water. The resin particles are purified in a dispersed state in water by repeating the process of the centrifugation and the redispersion. The purified resin particles may optionally be condensed. The condensation is performed, for example, using an evaporator or by ultrafiltration.

Salts

The ink according to aspects of the present invention contains at least either an inorganic acid salt or an organic acid salt. The effect according to aspects of the present invention can be further enhanced by containing an organic acid salt or an inorganic acid salt. Specifically, image density, water resistance, scratch resistance, and also character grade in printing of small characters are increased. These are probably achieved by that the organic acid salt or the inorganic acid salt contained in an ink applied to a recording medium accelerates the deposition of the pigment and the resin particles, that is, accelerates solid-liquid separation of the pigment and the resin particles from the aqueous solvent. As a result, the pigment and the resin particles can selectively remain on the recording medium surface. Consequently, the resin particles can be efficiently fused with the pigment, and the color of the recording image is highly developed. Furthermore, the acceleration of solid-liquid separation effectively contributes to expression of water resistance and scratch resistance. In addition, the period of time for fixation of the ink landed on a recording medium is shortened to inhibit bleeding, resulting in contribution to an improvement in character grade in printing of small characters. In order to express these effects, the inorganic acid salt or the organic acid salt is present in a dissociated state in the ink. Accordingly, the inorganic acid salt or the organic acid salt to be added to an ink has an acid dissociation constant (pKa) lower than the pH of the ink.

Examples of inorganic acid that constitutes such an inorganic acid salt include hydrochloric acid, sulfuric acid, and nitric acid. Examples of organic acid that constitutes the organic acid salt are organic carboxylic acids including citric acid, succinic acid, benzoic acid, acetic acid, propionic acid, phthalic acid, oxalic acid, tartaric acid, gluconic acid, tartronic acid, maleic acid, malonic acid, and adipic acid, in particular, acetic acid, phthalic acid, and benzoic acid. Examples of the counter ions to form salts include alkali metal, ammonium, and organic ammonium ions as in the counter ions of the self-dispersing pigment. Specific examples of the alkali metal as a counter ion include Li, Na, K, Rb, and Cs. Specific examples of the organic ammonium include methylammonium, dimethylammonium, trimethylammonium, ethylammonium, diethylammonium, triethylammonium, monohydroxymethyl(ethyl)ammonium, dihydroxymethyl(ethyl)ammonium, trihydroxymethyl(ethyl) ammonium, and triethanolammonium.

The total content of the inorganic acid salt and/or organic acid salt in an ink according to aspects of the present invention is 0.1% by mass or more and 5.0% by mass or less, such as 0.2% by mass or more and 3.0% by mass or less, based on the total amount of the ink. If the content is less than 0.1% by mass, the deposition effect of the pigment and the resin particles after landing of the ink on a recording medium may be deteriorated. If the content is higher than 5.0% by mass, solid-liquid separation may occur in the ink to reduce dispersion stability of the ink.

Others

The ink according to aspects of the present invention contains water. The content of the water in the ink is 30% by mass or more and 95% by mass or less based on the total amount of the ink. The ink can contain a water-soluble compound, in addition to water. The water-soluble compound has high hydrophilicity to be miscible with water in a mixture solution containing 20% by mass of water without causing phase separation. The water-soluble compound not easily evaporating, for example, showing a vapor pressure of 0.04 mmHg or less at 20° C., is used from the viewpoint of preventing solid-liquid separation and clogging.

Furthermore, the ink according to aspects of the present invention may contain a water-soluble compound having a hydrophilicity/hydrophobicity coefficient of not less than 0.26. The hydrophilicity/hydrophobicity coefficient is defined by the following Equation (A):

$$\frac{\text{Hydrophilicity}}{\text{hydrophobicity coefficient}} = \frac{(\text{water activity value of 20\% aqueous solution}) - (\text{molar fraction of water in 20\% aqueous solution})}{1 - (\text{molar fraction of water in 20\% aqueous solution})} \quad \text{Equation (A)}$$

Furthermore, depending on the type of paper as the recording medium, an ink containing both a water-soluble compound of which hydrophilicity/hydrophobicity coefficient defined by Equation (A) is 0.26 or more and less than 0.37 and a water-soluble compound having of which hydrophilicity/hydrophobicity coefficient is 0.37 or more may be used. In this case, the ink may contain two or more types of water-soluble compounds each having a hydrophilicity/hydrophobicity coefficient of not less than 0.37.

The term “water activity value” in the equation is defined by “water activity value=(water vapor pressure of aqueous solution)/(water vapor pressure of pure water)”. The measurement of the water activity value can be performed by various methods and is not particularly limited to any of them. For example, a Chilled Mirror dew point method can be suitable for measuring water activity values of the materials used according to aspects of the present invention. The values in this specification are those measured by this method using a 20% aqueous solution of each water-soluble compound at 25° C. with Aqualove CX-3TE (manufactured by Decagon Devices, Inc.).

According to the Raoult’s Law, the rate of vapor pressure depression of a dilute solution is equal to the molar fraction of the solute and is independent of the types of the solvent and the solute. Therefore, the molar fraction of water in an aqueous solution is equal to the water activity value. However, many of measured water activity values of aqueous solutions of various water-soluble compounds do not coincide with the molar fraction of water. If the water activity value of an aqueous solution is lower than the molar fraction of water, the water vapor pressure of the aqueous solution is lower than the theoretical value, and the solute inhibits water from evaporating. This teaches that the solute has a large hydration force. In contrast, if the water activity value of an aqueous solution is higher than the molar fraction of water, it is believed that the solute has a small hydration force.

The present inventors have considered that the degree of hydrophilicity or hydrophobicity of the water-soluble compound contained in an ink greatly affects promotion of solid-liquid separation between the self-dispersing pigment and the aqueous medium and also affects various performances of the ink. Accordingly, the present inventors have defined a coefficient, i.e., the hydrophilicity/hydrophobicity coefficient represented by Equation (A). Water activity values are measured using aqueous solutions of various water-soluble compounds at a fixed concentration of 20% by mass. The conversion with Equation (A) allows relative comparison of the degrees of hydrophilicity or hydrophobicity of various solutes even if the solutes have different molecular weights and accordingly the molar fractions of water differ. Since the water activity value of an aqueous solution does not exceed 1, the maximum hydrophilicity/hydrophobicity coefficient is 1. Table 1 shows the hydrophilicity/hydrophobicity coefficients calculated by Equation (A) for water-soluble compounds contained in the inks for ink-jet recording. However, the water-soluble compound used in the invention is not limited to these compounds.

TABLE 1

| Material | Hydrophilicity/hydrophobicity coefficient |
|---|---|
| 1,2-Hexanediol | 0.97 |
| 1,2-Pentanediol | 0.93 |
| 3-Methyl-1,3-butanediol | 0.90 |
| 1,2-Butanediol | 0.90 |
| 2,4-Pentanediol | 0.88 |
| 1,6-Hexanediol | 0.76 |
| 1,7-Heptanediol | 0.73 |
| 3-Methyl-1,5-pentanediol | 0.54 |
| 1,5-Pentanediol | 0.41 |
| Trimethylolpropane | 0.31 |
| Ethylene urea | 0.30 |
| 1,2,6-Hexanetriol | 0.28 |
| 1,2,3-Butanetriol | 0.22 |
| Sorbitol | 0.21 |
| Urea | 0.20 |
| Ethylene glycol | 0.15 |
| 1,2,4-Butanetriol | 0.15 |
| Glycerin | 0.11 |
| Diglycerin | 0.08 |
| Triethylene glycol | 0.07 |
| Polyethylene glycol 200 | −0.09 |
| Polyethylene glycol 600 | −0.43 |

The water-soluble compound having a desired hydrophilicity/hydrophobicity coefficient is selected from various water-soluble compounds possessing aptitude as those contained in an ink. The present inventors have investigated relationship between water-soluble compounds and various performances of an ink containing water-soluble compounds having different hydrophilicity/hydrophobicity coefficients and, as a result, have obtained the following findings. Printing characteristics of small characters, such as bleeding between two colors and thickened characters, are significantly improved by adding a water-soluble compound having a hydrophilicity/hydrophobicity coefficient of not less than 0.26 to the ink. The printing characteristics can be improved, in particular, by using a water-soluble compound having a glycol structure in which the number of carbon atoms substituted by hydrophilic groups is smaller than the number of carbon atoms not substituted by hydrophilic groups. These water-soluble compounds probably show relatively low affinity to water, the self-dispersing pigment, and cellulose fibers after landing of the ink on a recording medium and thereby highly enhance solid-liquid separation thereof from the self-dispersing pigment. Accordingly, the ink according to aspects of the present invention may contain at least one water-soluble compound of which hydrophilicity/hydrophobicity coefficient defined by Equation (A) is not less than 0.26. In particular, trimethylolpropane can be used as the water-soluble compound of which hydrophilicity/hydrophobicity coefficient defined by Equation (A) is 0.26 or more and less than 0.37. As the water-soluble compound having a hydrophilicity/hydrophobicity coefficient of not less than 0.37, those having a glycol structure of hydrocarbon having 4 to 7 carbon atoms, in particular, 1,2-hexanediol or 1,6-hexanediol can be used. In the case where two or more water-soluble compounds having a hydrophilicity/hydrophobicity coefficient of not less than 0.37 are used, the difference between hydrophilicity/hydrophobicity coefficients (difference between the highest value and the lowest value) of these water-soluble compounds is at least 0.1.

The total content of the water-soluble compound in the ink according to aspects of the present invention is 5.0% by mass or more, such as 6.0% by mass or more, and even 7.0% by mass or more and may be 40.0% by mass or less, such as 35.0% by mass or less, and even 30.0% by mass or less, based on the total amount of the ink.

In order to achieve a well-balanced discharge stability, the ink according to aspects of the present invention may contain a surfactant. For example, a nonionic surfactant, such as a polyoxyethylene alkyl ether or an ethylene oxide adduct of acetylene glycol, can be used. Such a nonionic surfactant has a hydrophile-lipophile balance (HLB) value of not less than 10. The content of the surfactant contained in an ink is 0.1% by mass or more, such as 0.2% by mass or more, and even 0.3% by mass or more and may be 5.0% by mass or less, such as 4.0% by mass or less, and even 3.0% by mass or less.

For preparing an ink having desired physical properties, the ink according to aspects of the present invention may optionally contain other additives, such as a pH adjuster, a viscosity modifier, an antifoaming agent, a preservative, a fungicide, an antioxidant, and a penetrant, in addition to the above-described components.

Surface Tension

The ink according to aspects of the present invention has a surface tension of 34 mN/m or less, such as 32 mN/m or less, and even 30 mN/m or less. Unlike plain paper, gloss paper or matte paper, which is exclusive paper for ink-jet printing, has an ink-receiving porous layer on the surface. Therefore, an ink immediately peneterates into the paper without being affected by surface tension of the ink. However, in some kinds of plain paper or printing paper, a sizing agent having water-repellent effect is internally and/or externally added to the paper, and thereby penetration of inks is inhibited in many cases. That is, the critical surface tension, which is an indicator of whether or not the surface is immediately wetted by an ink, of plain paper or printing paper is lower than that of exclusive paper for ink-jet printing. A surface tension of an ink of higher than 34 mN/m is higher than the critical surface tension of paper. Accordingly, the ink may not immediately wet the paper and may not rapidly penetrate into the paper after landing. Furthermore, if the surface tension is high, rapid fixing hardly occurs to deteriorate the fixing property, even if the wettability with paper is increased in some degree to reduce the contact angle between the ink and the paper. When the surface tension of the ink is 34 mN/m or less, pore absorption is mainly caused, and when the surface tension is higher than 34 mN/m, fiber absorption is mainly caused. In these two types of absorption of an ink into paper, the absorption rate of the pore absorption overwhelmingly higher than that of the fiber absorption. Accordingly, according to aspects of the present invention, high-speed fixing can be also realized by using a pore-absorption type ink. The pore-absorption type ink is advantageous from the viewpoint of preventing bleeding in the case where two types ink having different colors are recorded in adjacent to each other. This is because the two inks are prevented from simultaneously remaining on the paper surface. At the same time, from the viewpoint of handleability of the ink, the surface tension of the ink used according to aspects of the present invention is 20 mN/m or more, such as 23 mN/m or more, and even 26 mN/m or more. A surface tension of 20 mN/m or more can maintain the meniscus in a nozzle. Accordingly, "ink dripping", that is, falling out of the ink from a discharge opening to lose the ink in the nozzle, can be prevented. The surface tension is a value measured by a vertical plate method, specifically, measured with, for example, a surface tension meter CBVP-Z (manufactured by Kyowa Interface Science Co., Ltd.).

Aggregation Solution

The ink according to aspects of the present invention can be used together with an aggregation solution shown below. The aggregation solution refers to a solution containing a coagulant for aggregating the coloring material in an ink. The aggregation solution does not affect the color tone of an image to be formed by the ink. Therefore, the aggregation solution does not contain any coloring material. The coagulant can be a metal salt that generates a metal ion or an acidic compound that changes hydrogen ion concentration (pH).

As the metal salt, for example, those that generate multivalent metal ions are used. Examples of such a metal ion include divalent metal ions such as $Ca^{2+}$, $Cu^{2+}$, $Ni^{2+}$, $Mg^{2+}$, and $Zn^{2+}$; and trivalent metal ions such as $Fe^{3+}$ and $Al^{3+}$. In application of a solution containing such a metal salt, an aqueous solution of the metal salt is used. Examples of anions include $Cl^-$, $NO_3^-$, $SO_4^{2}$, $I^-$, $Br^-$, $ClO_3^-$, and $RCOO^-$ (R represents a monovalent organic group).

The acidic compound has a pH buffering ability and an acid dissociation constant (pKa) of not higher than 4.5, from the viewpoint of ink-aggregating ability. Examples of the acidic compound include organic carboxylic acids and organic sulfonic acids, more specifically, polyacrylic acid, acetic acid, methanesulfonic acid, glycolic acid, malonic acid, malic acid, maleic acid, ascorbic acid, succinic acid, glutamic acid, fumaric acid, citric acid, tartaric acid, lactic acid, sulfonic acid, orthophosphoric acid, pyrrolidone carboxylic acid, pylon carboxylic acid, pyrrole carboxylic acid, furan carboxylic acid, viridine carboxylic acid, coumaric acid, thiophenecarboxylic acid, and nicotinic acid; and derivatives and salts of these compounds.

The above-mentioned metal salts or the acidic compounds may be used alone or in combination of two or more thereof. The content of the coagulant in the aggregating solution is 0.01% by mass or more and 90% by mass or less, such as 1% by mass or more, and even 10% by mass or more and such as 80% by mass or less, and even 70% by mass or less, based on the total mass of the aggregation solution.

Recording Method

The ink-jet recording method according to aspects of the present invention includes the step of applying an ink to a recording medium by discharging the ink from a recording head by action of thermal energy and the step of fixing the ink to the recording medium by heating the ink applied to the recording medium.

In the step of fixing the ink, the ink is heated at a temperature not lower than the glass transition temperature of resin particles, specifically, at 40° C. or more and even at 60° C. or more. If the heating temperature is lower than 40° C., the ink cannot be sufficiently heated, and it is difficult to form a satisfactory film of colored particles. In addition, the temperature of heating the ink may be 200° C. or less such as 150° C. or less. In the case of a heating temperature of higher than 200° C., the energy load is significantly high. The heating can be performed by, for example, hot-air heating, radiative heating, or conduction heating. These methods may be used in combination. In aspects of the present invention, in the case where the aggregation solution is used together with an ink, the step of applying the aggregation solution may be performed at any timing of before the step of applying the ink; after the step of applying the ink and before the step of fixing the ink; or after the step of fixing the ink.

In the ink-jet recording method according to aspects of the present invention, the volume of an ink droplet to be applied at one discharge is constant and is 0.5 pL or more and 6.0 pL or less, such as 1.0 pL or more, and even 1.5 pL or more and such as 5.0 pL or less, and even 4.5 pL or less. If the volume is smaller than 0.5 pL, landing of the ink droplet is readily affected by air flow, which may decrease the precision of landing positions of ink droplets. If the volume is larger than 6.0 pL, in the case where small characters of about 2 to 5 points (1 point is approximately 0.35 mm) are printed, the characters may blur due to thickening. The discharge volume of the ink highly affects strike-through of the ink and is therefore important also from the viewpoint of application to duplex printing. In plain paper and some of printing paper, in particular, non-coated printing paper, pores of 0.1 to 100 μm with a central size of 0.5 to 5.0 μm are usually distributed. Penetration of an aqueous ink into these recording media is roughly classified into fiber absorption in which an ink penetrates through direct absorption by cellulose fibers themselves and pore absorption in which an ink penetrates through absorption by pores formed between cellulose fibers. The ink used according to aspects of the present invention is a pore-absorption type ink. Accordingly, when the ink used according to aspects of the present invention applied to a recording medium is partially brought into contact with pores having relatively large size of about 10 μm or more present on the surface of the recording medium, the ink is mainly absorbed by the pores having relatively large sizes according to the Lucas-Washburn equation and penetrates. As a result, the ink penetrates deeply in particular at this portion, which is significantly disadvantageous for high color development. Meanwhile, the probability of one drop of the ink contacting with a large pore increases with a decrease in size of the ink droplet. Therefore, small droplets of an ink are not mainly absorbed in large cores. Furthermore, for example, even if small droplets of an ink come into contact with large pores, the amount of the ink that penetrates deeply is small. As a result, the color of the image on a recorded medium is highly developed.

According to aspects of the present invention, the constant volume of an ink refers to that the ink is discharged from nozzles configuring a printing head and having the same structures as each other or that the ink is discharged in the state where the driving energy for applying the ink does not vary. That is, the volume of ink to be applied is constant as long as the ink is discharged in such a state, even if the discharge is slightly varied due to, for example, the variation among apparatuses in manufacture. By making the volume of the ink to be applied constant, in printing on a recording medium allowing an ink to relatively easily penetrate, such as plain paper or non-coated paper, the depth of penetration of the ink is stabilized to provide the recording image with a high density and satisfactory uniformity. In contrast, when a system in which the volume of an ink to be applied varies is used, applied ink droplets have different volumes, and accordingly, the depth of penetration of the ink considerably varies. In particular, the high-density portions of a recording image have, for example, a place at which the density of the recording image is low due to the variation in penetration depth, and, thus, the uniformity of the image is degraded.

In printing to a recording medium to which penetration of ink is relatively difficult, such as coated paper, the diameter of a dot formed on the recording medium highly depends on the discharge volume of ink to be applied. Accordingly, the discharge volume affects the uniformity of the image. Printing paper such as lightly coated paper and coated paper has a surface provided with coating in order to enhance the fineness and smoothness, and therefore ink hardly penetrates therein. Accordingly, in the case where the printing paper described above is used, the diameters of dots formed on the printing paper differ from one another if the discharge volumes of the ink vary. In particular, in printing of low-duty portions, color density unevenness occurs, but ink dots can have a uniform diameter by applying the ink in a constant volume, resulting in an improvement in uniformity of the image also at low-duty portions.

The thermal ink-jet recording method in which an ink is discharged from a recording head by action of thermal energy is suitable for obtaining a constant volume of the ink. This can reduce the variation in penetration depth of the ink and the variation in diameter of the dot to be formed, resulting in satisfactory uniformity of the recording image. Furthermore, the thermal ink-jet system is more suitable for increasing the number of nozzles and increasing the nozzle density than a system for applying an ink by action of piezoelectric elements and is also suitable for high-speed recording.

The ink-jet recording method according to aspects of the present invention can readily express the effect in the case where an image including a portion having a duty of 80% or more is formed in a basic matrix for forming the image. The duty is calculated in an area of at least 50 μm×50 μm. An image including a portion having a duty of 80% or more refer to an image having a portion formed by applying ink to 80% or more of the lattices of the matrix of the portion whose duty is to be calculated. The size of the lattices depends on the resolution of the basic matrix. For example, when the resolution of the basic matrix is 1200 dpi×1200 dpi, the size of one lattice is 1/1200 inch×1/1200 inch. The image including a portion having a duty of 80% or more in a basic matrix refers to an image including a portion having a duty of 80% or more with one color ink in the basic matrix. That is, when four color inks of black, cyan, magenta, and yellow are used, the image refers to an image formed by at least one color ink thereof and including a portion having a duty of 80% or more in a basic matrix. In an image not including a portion having a duty of 80% or more in a basic matrix, overlapping between ink droplets landed on paper is relatively low to avoid problems such as thickened characters and bleeding in many cases, even if the printing process is not improved. The basic matrix used according to aspects of the present invention can be arbitrarily set depending on, for example, a recording apparatus. The resolution of the basic matrix is 600 dpi or more, such as 1200 dpi or more and 4800 dpi or less. The vertical resolution and the horizontal resolution may be the same or different as long as the resolutions are within this range.

The ink-jet recording method according to aspects of the present invention can readily express its effect in the case where an image including a portion to which an ink is applied in the total amount of 5.0 μL/cm$^2$ or less is formed in the basic matrix for forming the image. Aspects of the present invention can further satisfy a requirement in the case where an image including a portion to which an ink is applied in the total amount of 5.0 μL/cm$^2$ or less is formed in the basic matrix for forming the image. According to aspects of the present invention, in the case where an image including a portion having a duty of 80% or more and to which an ink is applied in the total amount of 5.0 μL/cm$^2$ or less is formed in the basic matrix for forming the image, the application of the ink is performed by dividing the application into two or more times. The amount of the ink in each divided application for forming an image is 0.7 μL/cm$^2$ or less, such as 0.6 μL/cm$^2$ or less, and even 0.5 μL/cm$^2$ or less. If the amount of the ink in each divided application for forming an image is larger than 0.7 μL/cm$^2$, strike-through, thickened characters, and bleeding may occur.

According to aspects of the present invention, the divided application of an ink in forming an image shows a different performance from that in not divided application, and the divided application can be employed. The number of times of divided applications is at least two, and the recording image can have a high density and a good color-developing property in divided applications three or more times. The number of times of divided applications is eight times or less, such as four times or less. Divided applications exceeding eight times is effective for inhibition of breeding and good printing of small characters, but decreases the covering ratio of the ink on the surface of plain paper or non-coated paper and tends to deteriorate the color-developing property. The applications of an ink in two or more times are roughly classified into serial-type recording apparatuses and line-type recording apparatuses. In an example of the serial-type recording apparatus, for example, a solid printing is usually performed by a two-time application, in which the recording head passes across a recording medium twice (two-pass operation). In such a divided application, the amount of the ink for each application is often the same, but the present invention is not limited such a divided application procedure. FIG. 1 shows an exemplary arrangement of dots that have landed for 100% solid printing by two-pass operation in which an amount of ink equivalent to 50% is applied onto a recording medium by the first pass and, then, an amount equivalent to the other 50% is applied onto the remaining portion of the recording medium by the second pass. In addition to the serial-type divided application method described above, aspects of the present invention can also be applied to a line-type application in which dots are printed on the same positions as in FIG. 1 by two-divided application during a single pass operation. For example, as an embodiment of applying a black ink by two divided applications during a single pass operation, recording heads shown in FIG. 3 may be used. In an embodiment of the color head configuration shown in FIG. 3, the heads represented by reference numerals 211, 212, 213, 214 and 215 discharge black (K), cyan (C), magenta (M), yellow (Y), and black (K) inks, respectively. In this configuration example, a black ink is divided into two nozzle lines so as to be applied substantially by a single pass operation. Similarly, divided printing of various inks can be perform by divided application of the inks two or more times during substantially a single pass operation by varying the number of nozzle lines of the head or the number of inks mounted on the head. The effects of the ink according to aspects of the present invention are more significantly expressed when, in a single head, the period of time from the beginning of the first ink application to the completion of the final ink application of a single ink is 1 msec or more and less than 200 msec.

The ink according to aspects of the present invention is applied to a recording medium. As the recording medium, for example, printing paper is used. Examples of the printing paper include copy paper such as commercially available high- and medium-quality paper and PPC paper, which are used for printers, copiers, etc. in a large amount; plain paper such as bond paper; non-coated paper, in which cellulose fibers, which are a main constitutional component of recording media, are highly compressed, compared to copy paper, by calender treatment due to requirement for smoothness; and lightly coated paper and coated paper each having a surface provided with coating in order to enhance the fineness and smoothness.

Ink-Jet Recording Apparatus

An ink-jet recording apparatus for conducting the ink-jet recording method according to aspects of the invention will now be described. The recording apparatus used according to aspects of the present invention is a type having a recording head that applies ink by action of thermal energy.

The principle and a typical configuration of the recording head that discharges ink by applying thermal energy to the ink are disclosed in, for example, U.S. Pat. Nos. 4,723,129 and 4,740,796. This system can be applied to a so-called on-demand type and a continuous type, in particular, advantageously applied to an on-demand type. That is, in the case of the on-demand type, at least one driving signal is applied to an electric thermal conversion member disposed so as to correspond to a sheet or a liquid path that holds an ink in such a manner that a rapid increase in temperature to a level causing nucleate boiling is given according to recording information. By applying the signal, the electric thermal conversion member generates thermal energy to cause film boiling in the thermoactive surface of the recording head. Consequently, an air bubbles are formed in the ink so as to correspond to the driving signals at a ratio of 1:1. Growth and contraction of the air bubbles discharge ink through each discharge opening to form at least one droplet of the ink. By employing the driving signal in a pulse form, air bubbles can immediately and appropriately grow or contract, resulting in achievement of discharge of the ink in a constant volume and with good response.

Figure 2:
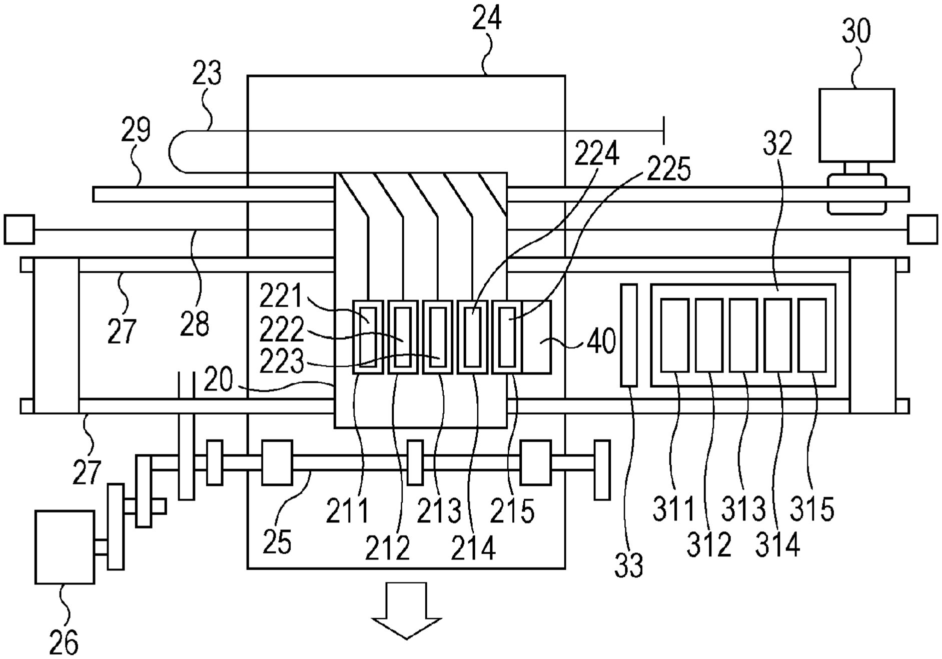
FIG. 2 is a diagram illustrating an ink-jet recording apparatus.

FIG. 2 is a schematic diagram illustrating an embodiment of the ink-jet recording apparatus according to aspects of the present invention. The ink-jet recording apparatus includes a carriage 20 on which a plurality of recording heads 211 to 215 for an ink-jet system are mounted. The recording heads 211 to 215 each have a plurality of ink-discharge opening lines for discharging an ink. In an embodiment of a configuration for two-divided application of a black ink during a single pass operation, the recording heads 211, 212, 213, 214, and 215 are examples of the recording heads according to aspects of the present invention for discharging black (K), cyan (C), magenta (M), yellow (Y), and black (K) inks, respectively. Ink cartridges 221 to 225 are composed of the recording heads 211 to 215 and ink tanks that supply inks to the corresponding cartridges. A density sensor 40 is of a reflective type and is disposed on a side face of the carriage 20 so as to detect the density of a test pattern recorded on a recording medium. Control signals and other signals are transferred to the recording heads 211 to 215 through a flexible cable 23. A recording medium 24 is pinched by paper-ejecting rollers 25 through a conveying roller (not shown) and is transported in the direction (sub-scanning direction) indicated by the arrow according to driving of a conveying motor 26. The carriage 20 is supported and guided by a guide shaft 27 and a linear encoder 28. The carriage 20 reciprocates in the main scanning direction along the guide shaft 27 with a driving belt 29 driven by a carriage motor 30. A heater element (thermal-electric energy conversion member) generating thermal energy for discharging an ink is disposed in the insides of ink-discharge openings (liquid paths) of each of the recording heads 211 to 215. When the linear encoder 28 has read data, the heater element is driven to discharge ink droplets onto a recording medium according to the recording signal, and the adhering ink forms an image. A recovery unit 32 including cap portions 311 to 315 is disposed at a home position of the carriage 20 located outside the recording region. When recording is not performed, the carriage 20 is located at the home position, and the ink-discharge openings of the nozzle heads 211 to 215 are sealed with the respective cap portions 311 to 315. By doing so, the ink can be prevented from being hardened by evaporation of the solvent from the ink, and clogging by adhesion of foreign matter such as dust can be prevented from occurring. The capping function of the cap portions is also used for inhibiting failure in discharge or clogging of the discharge opening for an ink that is not frequently used. More specifically, the cap portions are used for idle discharge that is performed to prevent failure in discharge by discharging the ink to the cap portion disposed apart from the discharge opening. Furthermore, the cap portions are used for recovering the function of the discharge opening that has caused failure in discharge by sucking the ink from the discharge opening covered with the cap portion using a pump (not shown). An ink receiver 33 has a function of receiving ink droplets preliminarily discharged when the recording heads 211 to 215 pass over the ink receiver 33 immediately before recording operation. A blade or wiping member (not shown) is provided at a position adjacent to the cap portions, and the faces of the nozzle heads 211 to 215 at which the discharge openings are formed can be cleaned with the blade or wiping member. A heating element 411 heats and dries the ink on a recording medium 24 transported by the paper-ejecting rollers 25.

As described above, a recovery device or a backup device can be added to the configuration of the recording apparatus from the viewpoint of further stabilizing the recording operation. Specific examples of such a device include a capping device, a cleaning device, and a compressing or sucking device for the recording heads. A pre-discharge mode that performs discharge not intended for recording is also effective from the viewpoint of performing stable recording. Furthermore, a cartridge-type recording head in which an ink tank is integrated to the recording head described in the above-described embodiments may be used. A replaceable chip-type recording head, which can be electrically connected to a recording apparatus and can be supplied with an ink from the apparatus by being installed to the recording apparatus, may be used.

Figure 3:
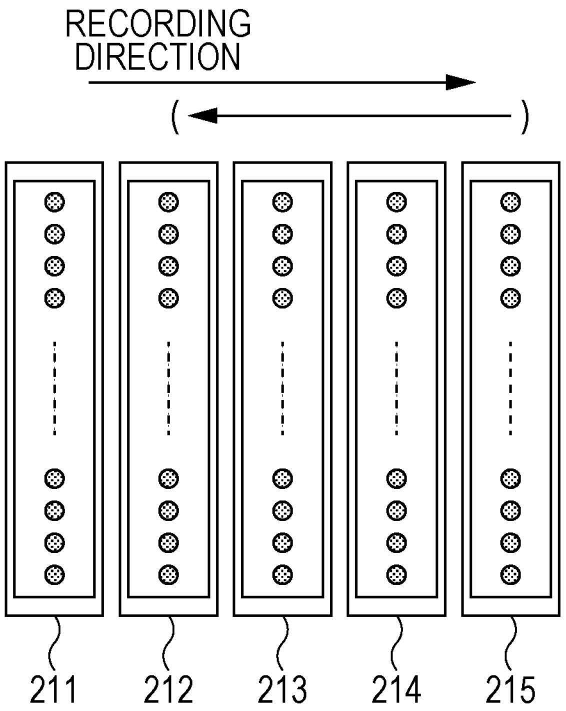
FIG. 3 is a diagram illustrating a serial-type recording head.
Figure 4:
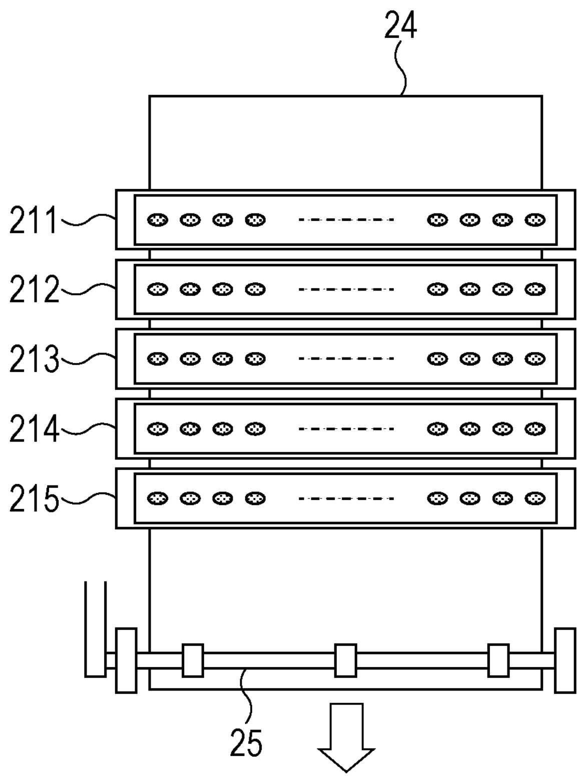
FIG. 4 is a diagram illustrating a line-type recording head.

The recording head shown in FIG. 3 is of a serial type that performs recording by scanning the recording head, and also a full-line type in which a recording head having a length corresponding to the width of the recording medium may be used. The full-line-type recording head may be configured by, as shown in FIG. 4, serial-type recording heads arranged in a zigzag manner or in parallel with each other to be lengthened to a desired length. Alternatively, a single recording head formed in an integrated manner so as to have a longer nozzle line may be used.

In the recording apparatuses having the serial or full-line recording head described above, recording heads composed of five discharge opening lines (or nozzle lines) in which a black ink, among four color inks (Y, M, C, and K), is discharged from two black ink recording heads 211 and 215 are mounted on the apparatus. Alternatively, as an embodiment suitable for divided application with four discharge opening lines (or nozzle lines), a system in which at least one of four color inks (Y, M, C, and K) is loaded in a plurality of discharge opening lines (or nozzle lines) may be used. For example, two or three recording heads each having four discharge opening lines (or nozzle lines) may be connected to form a configuration having eight discharge opening lines (or nozzle lines) or twelve discharge opening lines (or nozzle lines).

According to aspects of the present invention, an image including a portion having a duty of 80% or more and to which an ink is applied in the total amount of 5.0 $\mu L/cm^2$ or less is formed in the basic matrix for forming the image by two or more divided applications. The volume of ink applied by each divided application is controlled to 0.7 $\mu L/cm^2$ or less. The ink-jet recording apparatus has a control mechanism for performing such divided application. This control mechanism controls the behaviors of the ink-jet recording heads and the timing of the recording medium-feeding behavior for performing divided application.

EXAMPLES

Aspects of the present invention will be further described in detail with reference to Examples and Comparative Examples. In the following description, the term "part(s)" is on a mass basis unless otherwise specified. Incidentally, the average particle diameter (D50) was measured with Nanotrac UPA 150EX (manufactured by Nikkiso Co., Ltd., measured as a 50% cumulative value); the acid value was measured, as a water dispersion of resin particles, by potentiometric titration using Titrino (manufactured by Metrohm Ltd.); the glass transition temperature was measured with DSC822 (manufactured by Mettler Toledo International Inc.); and the weight-average molecular weight was measured with HLC-8220GPC (manufactured by Tosoh Corporation).

Self-Dispersing Pigment

As the self-dispersing pigments of black inks, CAB-O-JET400 (manufactured by Cabot Corp.), CAB-O-JET300 (manufactured by Cabot Corp.), BONJET BLACK CW-2 (manufactured by Orient Chemical Industries Co., Ltd.) were used. As the self-dispersing pigments of color inks, CAB-O-JET470Y (manufactured by Cabot Corp.), CAB-O-JET465M (manufactured by Cabot Corp.), and CAB-O-JET450C (manufactured by Cabot Corp.) were used respectively for yellow, magenta, and cyan inks.

Resin Particles 1

According to the aforementioned production example of resin particles, polymerization was performed using predetermined monomers, i.e., styrene/acrylic acid at a ratio of 9.0/1.5 (mass ratio) and sodium dodecyl sulfate at a ratio of 0.35 (mass ratio). After the polymerization, a dispersion containing resin particles 1 at a solid content of 10% by mass was obtained after purification and concentration. The pH of the dispersion was adjusted to 8.5. The resin particles 1 had an average particle diameter (D50) of 76 nm, an acid value of 100 mg KOH/g, a glass transition temperature (Tg) of 106° C., and a weight-average molecular weight (Mw) of 730000.

Resin Particles 2

According to the aforementioned production example of resin particles, polymerization was performed using predetermined monomers, i.e., styrene/acrylic acid at a ratio of 9.0/1.5 (mass ratio) and sodium dodecyl sulfate at a ratio of 0.25 (mass ratio). After the polymerization, a dispersion containing resin particles 2 at a solid content of 10% by mass was obtained after purification and concentration. The pH of the dispersion was adjusted to 8.5. The resin particles 2 had an average particle diameter (D50) of 89 nm, an acid value of 100 mg KOH/g, a glass transition temperature (Tg) of 112° C., and a weight-average molecular weight (Mw) of 520,000.

sulfate at a ratio of 0.25 (mass ratio). After the polymerization, a dispersion containing resin particles 4 at a solid content of 10% by mass was obtained after purification and concentration. The pH of the dispersion was adjusted to 8.5. The resin particles 4 had an average particle diameter (D50) of 93 nm, an acid value of 101 mg KOH/g, a glass transition temperature (Tg) of 49° C., and a weight-average molecular weight (Mw) of 460,000.

Resin Particles 5 to 18

As in the production examples of the resin particles 1 to 4, polymerization was performed with monomer compositions shown in Table 2. After the polymerization, dispersion containing resin particles 5 to 18 at a solid content of 10% by mass were obtained after purification and concentration. The average particle diameters (D50s), the acid values, the glass transition temperatures (Tgs), and the weight-average molecular weights (Mws) of the resin particles are shown in Table 2. Note that St, MMA, nBA, EHA, AA, and MAA in Table 2 represent styrene, methyl methacrylate, n-butyl acrylate, 2-ethylhexyl acrylate, acrylic acid, and methacrylic acid, respectively.

TABLE 2

| | Synthesis condition | | | | | | | Average | |
|---|---|---|---|---|---|---|---|---|---|
| | Hydrophobic monomer [part by mass] | | | | Hydrophilic monomer [part by mass] | | Tg | particle diameter (D50) | Acid value |
| | St | MMA | nBA | EHA | AA | MAA | [° C.] | [nm] | [mgKOH/g] |
| Resin particles 1 | 9.0 | — | — | — | 1.5 | — | 106 | 76 | 100 |
| Resin particles 2 | 9.0 | — | — | — | 1.5 | — | 112 | 89 | 100 |
| Resin particles 3 | 9.0 | — | — | — | 1.5 | — | 111 | 107 | 104 |
| Resin particles 4 | 6.0 | — | 3.0 | — | 1.5 | — | 49 | 93 | 101 |
| Resin particles 5 | 7.0 | — | 2.0 | — | 1.5 | — | 58 | 210 | 101 |
| Resin particles 6 | 7.0 | — | 2.0 | — | 1.5 | — | 58 | 168 | 105 |
| Resin particles 7 | 7.0 | — | 2.0 | — | 1.5 | — | 50 | 122 | 100 |
| Resin particles 8 | 7.5 | — | 2.0 | — | 1.0 | — | 60 | 158 | 70 |
| Resin particles 9 | 8.0 | — | 2.0 | — | 0.5 | — | 52 | 152 | 35 |
| Resin particles 10 | 7.5 | — | — | 2.0 | — | 1.0 | 70 | 152 | 61 |
| Resin particles 11 | — | 7.5 | 2.0 | — | — | 2.5 | 71 | 122 | 122 |
| Resin particles 12 | — | 9.0 | — | — | 1.5 | — | 115 | 96 | 102 |
| Resin particles 13 | 9.0 | — | — | — | 4.5 | — | 116 | 211 | 182 |
| Resin particles 14 | 10.2 | — | — | — | 0.3 | — | 102 | 155 | 20 |
| Resin particles 15 | 3.0 | — | — | 6.0 | 1.5 | — | −6 | 75 | 105 |
| Resin particles 16 | 9.0 | — | — | — | 1.5 | — | 97 | 268 | 95 |
| Resin particles 17 | 9.0 | — | — | — | 1.5 | — | 111 | 62 | 110 |
| Resin particles 18 | 9.0 | — | — | — | 1.5 | — | 101 | 29 | 110 |

Resin Particles 3

According to the aforementioned production example of resin particles, polymerization was performed using predetermined monomers, i.e., styrene/acrylic acid at a ratio of 9.0/1.5 (mass ratio) and sodium dodecyl sulfate at a ratio of 0.10 (mass ratio). After the polymerization, a dispersion containing resin particles 3 at a solid content of 10% by mass was obtained after purification and concentration. The pH of the dispersion was adjusted to 8.5. The resin particles 3 had an average particle diameter (D50) of 107 nm, an acid value of 104 mg KOH/g, a glass transition temperature (Tg) of 111° C., and a weight-average molecular weight (Mw) of 280,000.

Resin Particles 4

According to the aforementioned production example of resin particles, polymerization was performed using predetermined monomers, i.e., styrene/n-butyl acrylate/acrylic acid at a ratio of 6.0/3.0/1.5 (mass ratio) and sodium dodecyl Preparation of Ink Inks used in Examples of aspects of the present invention and Comparative Examples were prepared as below. The inks were prepared basically by mixing all components (100 parts in total), shown in Table 3 (black inks) and Table 4 (color inks), constituting each ink, stirring the mixture for 1 hr, and filtering the mixture through a filter with a pore diameter of 2.5 μm. In Tables 3 and 4, water is deionized water; the values of the self-dispersing pigment and resin particles 1 to 18 refer to mass parts of the solid contents; Acetylenol EH (manufactured by Kawaken Fine Chemicals Co., Ltd.) is an ethylene oxide adduct of acetylene glycol; and the surface tensions of the inks were measured with CBVP-Z (manufactured by Kyowa Interface Science Co., Ltd.).

TABLE 3

| | Tg <° C.> | Particle diameter <nm> | Acid value <mgKOH/g> | Example 1 | 2 | 3 | 4 | 5 | 6 | 7 | 8 |
|---|---|---|---|---|---|---|---|---|---|---|---|
| Black ink No. | — | — | — | 1 | 2 | 3 | 4 | 5 | 6 | 7 | 8 |
| CAB-O-JET400 | — | — | — | 3.5 | 3.5 | 3.5 | 3.5 | — | — | — | — |
| CAB-O-JET300 | — | — | — | — | — | — | — | 3.5 | 3.5 | 3.5 | 3.5 |
| BONJET BLACK CW2 | — | — | — | — | — | — | — | — | — | — | — |
| Resin particles 1 | 106 | 76 | 100 | 3.0 | — | — | — | — | — | — | — |
| Resin particles 2 | 112 | 89 | 100 | — | 3.0 | — | — | — | — | — | — |
| Resin particles 3 | 111 | 107 | 104 | — | — | 3.0 | — | — | — | — | — |
| Resin particles 4 | 49 | 93 | 101 | — | — | — | 3.0 | — | — | — | — |
| Resin particles 5 | 58 | 210 | 101 | — | — | — | — | 3.0 | — | — | — |
| Resin particles 6 | 58 | 168 | 105 | — | — | — | — | — | 3.0 | — | — |
| Resin particles 7 | 50 | 122 | 100 | — | — | — | — | — | — | 3.0 | — |
| Resin particles 8 | 60 | 158 | 70 | — | — | — | — | — | — | — | 3.0 |
| Resin particles 9 | 52 | 152 | 35 | — | — | — | — | — | — | — | — |
| Resin particles 10 | 70 | 152 | 61 | — | — | — | — | — | — | — | — |
| Resin particles 11 | 71 | 122 | 122 | — | — | — | — | — | — | — | — |
| Resin particles 12 | 115 | 96 | 102 | — | — | — | — | — | — | — | — |
| Resin particles 13 | 116 | 211 | 182 | — | — | — | — | — | — | — | — |
| Resin particles 14 | 102 | 155 | 20 | — | — | — | — | — | — | — | — |
| Resin particles 15 | −6 | 75 | 105 | — | — | — | — | — | — | — | — |
| Resin particles 16 | 97 | 268 | 95 | — | — | — | — | — | — | — | — |
| Resin particles 17 | 111 | 62 | 110 | — | — | — | — | — | — | — | — |
| Resin particles 18 | 101 | 29 | 110 | — | — | — | — | — | — | — | — |
| Ammonium phthalate | — | — | — | — | 0.5 | 0.5 | 0.5 | 0.5 | — | 0.5 | 0.5 |
| Sodium sulfate | — | — | — | 0.36 | — | — | — | — | — | — | — |
| 1,2-Hexanediol | — | — | — | 10.0 | — | 10.0 | 10.0 | 10.0 | 10.0 | 10.0 | 10.0 |
| 1,6-Hexanediol | — | — | — | — | — | — | — | — | — | — | — |
| Trimethylol-propane | — | — | — | 10.0 | — | 10.0 | 10.0 | 10.0 | 10.0 | 10.0 | 10.0 |
| Glycerol | — | — | — | — | 20.0 | — | — | — | — | — | — |
| Isopropanol | — | — | — | 1.0 | 1.0 | 1.0 | 1.0 | 1.0 | 1.0 | 1.0 | 1.0 |
| Acetylenol EH | — | — | — | 1.0 | 1.0 | 1.0 | 1.0 | 1.0 | 1.0 | 1.0 | 1.0 |
| Water | — | — | — | remainder | remainder | remainder | remainder | remainder | remainder | remainder | remainder |
| pH adjuster | — | — | — | KOH | KOH | KOH | KOH | KOH | KOH | KOH | KOH |
| Surface tension <mN/m> | — | — | — | 30 | 30 | 30 | 30 | 30 | 30 | 31 | 31 |

| | Example 9 | 10 | 11 | 12 | Comparative Example 1 | 2 | 3 | 4 | 5 | 6 |
|---|---|---|---|---|---|---|---|---|---|---|
| Black ink No. | 9 | 10 | 11 | 12 | 13 | 14 | 15 | 16 | 17 | 18 |
| CAB-O-JET400 | — | — | — | — | 3.5 | 3.5 | — | — | — | — |
| CAB-O-JET300 | — | — | — | — | — | — | 3.5 | 3.5 | — | — |
| BONJET BLACK CW2 | 3.5 | 3.5 | 3.5 | 3.5 | — | — | — | — | 3.5 | 3.5 |
| Resin particles 1 | — | — | — | — | — | — | — | — | — | — |
| Resin particles 2 | — | — | — | — | — | — | — | — | — | — |
| Resin particles 3 | — | — | — | — | — | — | — | — | — | — |
| Resin particles 4 | — | — | — | — | — | — | — | — | — | — |
| Resin particles 5 | — | — | — | — | — | — | — | — | — | — |
| Resin particles 6 | — | — | — | — | — | — | — | — | — | — |
| Resin particles 7 | — | — | — | — | — | — | — | — | — | — |
| Resin particles 8 | — | — | — | — | — | — | — | — | — | — |
| Resin particles 9 | 3.0 | — | — | — | — | — | — | — | — | — |
| Resin particles 10 | — | 3.0 | — | — | — | — | — | — | — | — |
| Resin particles 11 | — | — | 3.0 | — | — | — | — | — | — | — |
| Resin particles 12 | — | — | — | 3.0 | — | — | — | — | — | — |
| Resin particles 13 | — | — | — | — | 3.0 | — | — | — | — | — |
| Resin particles 14 | — | — | — | — | — | 3.0 | — | — | — | — |
| Resin particles 15 | — | — | — | — | — | — | 3.0 | — | — | — |
| Resin particles 16 | — | — | — | — | — | — | — | 3.0 | — | — |
| Resin particles 17 | — | — | — | — | — | — | — | — | 3.0 | — |
| Resin particles 18 | — | — | — | — | — | — | — | — | — | 3.0 |
| Ammonium phthalate | 0.5 | — | 0.5 | 0.5 | — | 0.5 | 0.5 | 0.5 | 0.5 | 0.5 |
| Sodium sulfate | — | 0.36 | — | — | 0.36 | — | — | — | — | — |
| 1,2-Hexanediol | 10.0 | 10.0 | 10.0 | 10.0 | 5.0 | 5.0 | 5.0 | 5.0 | 5.0 | 5.0 |
| 1,6-Hexanediol | — | — | — | — | — | — | — | — | — | — |
| Trimethylol-propane | 10.0 | 10.0 | 10.0 | 10.0 | 15.0 | 15.0 | 15.0 | 15.0 | 15.0 | 15.0 |

TABLE 3-continued

| | | | | | | | | | | |
|---|---|---|---|---|---|---|---|---|---|---|
| Glycerol | — | — | — | — | — | — | — | — | — | — |
| Isopropanol | 1.0 | 1.0 | 1.0 | 1.0 | 1.0 | 1.0 | 1.0 | 1.0 | 1.0 | 1.0 |
| Acetylenol EH | 1.0 | 1.0 | 1.0 | 1.0 | 1.0 | 1.0 | 1.0 | 1.0 | 1.0 | 1.0 |
| Water | remainder | remainder | remainder | remainder | remainder | remainder | remainder | remainder | remainder | remainder |
| pH adjuster | KOH | KOH | KOH | KOH | KOH | KOH | KOH | KOH | KOH | KOH |
| Surface tension <mN/m> | 30 | 30 | 30 | 30 | 30 | 30 | 30 | 30 | 30 | 30 |

TABLE 4

| | Tg | Particle diameter | Acid value <mgKOH/ | Example | | | | | | | |
|---|---|---|---|---|---|---|---|---|---|---|---|
| | <° C.> | <nm> | g> | 13 | 14 | 15 | 16 | 17 | 18 | 19 | 20 |
| Color ink No. | — | — | — | 1 | 2 | 3 | 4 | 5 | 6 | 7 | 8 |
| CAB-O-JET470Y | — | — | — | 3.5 | 3.5 | 3.5 | 3.5 | — | — | — | — |
| CAB-O-JET465M | — | — | — | — | — | — | — | 3.5 | 3.5 | 3.5 | 3.5 |
| CAB-O-JET450C | — | — | — | — | — | — | — | — | — | — | — |
| Resin particles 1 | 106 | 76 | 100 | 3.0 | — | — | — | — | — | — | — |
| Resin particles 2 | 112 | 89 | 100 | — | 3.0 | — | — | — | — | — | — |
| Resin particles 3 | 111 | 107 | 104 | — | — | 3.0 | — | — | — | — | — |
| Resin particles 4 | 49 | 93 | 101 | — | — | — | 3.0 | — | — | — | — |
| Resin particles 5 | 58 | 210 | 101 | — | — | — | — | 3.0 | — | — | — |
| Resin particles 6 | 58 | 168 | 105 | — | — | — | — | — | 3.0 | — | — |
| Resin particles 7 | 50 | 122 | 100 | — | — | — | — | — | — | 3.0 | — |
| Resin particles 8 | 60 | 158 | 70 | — | — | — | — | — | — | — | 3.0 |
| Resin particles 9 | 52 | 152 | 35 | — | — | — | — | — | — | — | — |
| Resin particles 10 | 70 | 152 | 61 | — | — | — | — | — | — | — | — |
| Resin particles 11 | 71 | 122 | 122 | — | — | — | — | — | — | — | — |
| Resin particles 12 | 115 | 96 | 102 | — | — | — | — | — | — | — | — |
| Resin particles 13 | 116 | 211 | 182 | — | — | — | — | — | — | — | — |
| Resin particles 14 | 102 | 155 | 20 | — | — | — | — | — | — | — | — |
| Resin particles 15 | −6 | 75 | 105 | — | — | — | — | — | — | — | — |
| Resin particles 16 | 97 | 268 | 95 | — | — | — | — | — | — | — | — |
| Resin particles 17 | 111 | 62 | 110 | — | — | — | — | — | — | — | — |
| Resin particles 18 | 101 | 29 | 110 | — | — | — | — | — | — | — | — |
| Ammonium phthalate | — | — | — | — | — | — | — | 0.5 | — | 0.5 | — |
| Sodium sulfate | — | — | — | — | — | — | — | — | 0.36 | — | 0.36 |
| 1,2-Hexanediol | — | — | — | 10.0 | 10.0 | 10.0 | 10.0 | 10.0 | 10.0 | 10.0 | 10.0 |
| Trimethylolpropane | — | — | — | 10.0 | 10.0 | 10.0 | 10.0 | 10.0 | 10.0 | 10.0 | 10.0 |
| Isopropanol | — | — | — | 1.0 | 1.0 | 1.0 | 1.0 | 1.0 | 1.0 | 1.0 | 1.0 |
| Acetylenol EH | — | — | — | 1.0 | 1.0 | 1.0 | 1.0 | 1.0 | 1.0 | 1.0 | 1.0 |
| Water | — | — | — | remainder | remainder | remainder | remainder | remainder | remainder | remainder | remainder |
| pH adjuster | — | — | — | KOH | KOH | KOH | KOH | KOH | KOH | KOH | KOH |
| Surface tension <mN/m> | — | — | — | 31 | 31 | 31 | 31 | 31 | 31 | 32 | 31 |

| | Example | | | | Comparative Example | | | | | |
|---|---|---|---|---|---|---|---|---|---|---|
| | 21 | 22 | 23 | 24 | 7 | 8 | 9 | 10 | 11 | 12 |
| Color ink No. | 9 | 10 | 11 | 12 | 13 | 14 | 15 | 16 | 17 | 18 |
| CAB-O-JET470Y | — | — | — | — | 3.5 | 3.5 | — | — | — | — |
| CAB-O-JET465M | — | — | — | — | — | — | 3.5 | 3.5 | — | — |
| CAB-O-JET450C | 3.5 | 3.5 | 3.5 | 3.5 | — | — | — | — | 3.5 | 3.5 |
| Resin particles 1 | — | — | — | — | — | — | — | — | — | — |
| Resin particles 2 | — | — | — | — | — | — | — | — | — | — |
| Resin particles 3 | — | — | — | — | — | — | — | — | — | — |
| Resin particles 4 | — | — | — | — | — | — | — | — | — | — |
| Resin particles 5 | — | — | — | — | — | — | — | — | — | — |
| Resin particles 6 | — | — | — | — | — | — | — | — | — | — |
| Resin particles 7 | — | — | — | — | — | — | — | — | — | — |
| Resin particles 8 | — | — | — | — | — | — | — | — | — | — |
| Resin particles 9 | 3.0 | — | — | — | — | — | — | — | — | — |
| Resin particles 10 | — | 3.0 | — | — | — | — | — | — | — | — |
| Resin particles 11 | — | — | 3.0 | — | — | — | — | — | — | — |
| Resin particles 12 | — | — | — | 3.0 | — | — | — | — | — | — |
| Resin particles 13 | — | — | — | — | 3.0 | — | — | — | — | — |
| Resin particles 14 | — | — | — | — | — | 3.0 | — | — | — | — |
| Resin particles 15 | — | — | — | — | — | — | 3.0 | — | — | — |
| Resin particles 16 | — | — | — | — | — | — | — | 3.0 | — | — |
| Resin particles 17 | — | — | — | — | — | — | — | — | 3.0 | — |
| Resin particles 18 | — | — | — | — | — | — | — | — | — | 3.0 |

TABLE 4-continued

| | | | | | | | | | | |
|---|---|---|---|---|---|---|---|---|---|---|
| Ammonium phthalate | — | — | — | — | — | — | — | 0.5 | — | — |
| Sodium sulfate | — | — | — | — | — | — | 0.36 | — | — | — |
| 1,2-Hexanediol | 10.0 | 10.0 | 10.0 | 10.0 | 10.0 | 10.0 | 10.0 | 10.0 | 10.0 | 10.0 |
| Trimethylolpropane | 10.0 | 10.0 | 10.0 | 10.0 | 10.0 | 10.0 | 10.0 | 10.0 | 10.0 | 10.0 |
| Isopropanol | 1.0 | 1.0 | 1.0 | 1.0 | 1.0 | 1.0 | 1.0 | 1.0 | 1.0 | 1.0 |
| Acetylenol EH | 1.0 | 1.0 | 1.0 | 1.0 | 1.0 | 1.0 | 1.0 | 1.0 | 1.0 | 1.0 |
| Water | remainder | remainder | remainder | remainder | remainder | remainder | remainder | remainder | remainder | remainder |
| pH adjuster | KOH | KOH | KOH | KOH | KOH | KOH | KOH | KOH | KOH | KOH |
| Surface tension <mN/m> | 32 | 30 | 32 | 30 | 31 | 31 | 30 | 31 | 30 | 31 |

Examples 1 to 24 and Comparative Examples 1 to 12

Dispersion Stability

Inks of Examples 1 to 24 and Comparative Examples 1 to 12 shown in Tables 3 and 4 were left to stand at room temperature for 10 days, and aggregation states of the resin particles were visually evaluated based on the following evaluation criteria:

A: no aggregation is observed,

B: slight aggregation is observed, and

C: distinct aggregation and partial precipitation are observed.

Recording images were formed on recording media using the inks of Examples 1 to 24 and Comparative Examples 1 to 12. Specifically, any of the black inks shown in Table 3 was loaded in the black ink head portion and the cyan ink head portion of an ink-jet recording apparatus, and six lines of solid images having a duty of 100% were formed as recording images by applying the ink at a duty of 50% from each ink head portion. Any of the color inks shown in Table 4 was loaded in the black ink portion of the apparatus, and six lines of solid images having a duty of 100% were formed as recording images. As the ink-jet recording apparatus, BJ F900 (manufactured by CANON KABUSHIKI KAISHA, recording head: six discharge opening lines, each having 512 nozzles, ink volume: 4.0 pL (constant), maximum resolution: 1200 dpi (lateral direction)×1200 dpi (vertical direction)) equipped with an infrared lamp serving as a heating-fixing device at the paper output tray portion thereof was used. A heating temperature was set to 90° C. and was controlled with a thermocouple. As the recording media, non-coated paper, OK prince (manufactured by Oji Paper Co., Ltd.), and coated paper, OK Topcoat+(manufactured by Oji Paper Co., Ltd.), were used.

The inks of Examples 1 to 24 and Comparative Examples 1 to 12 were evaluated for discharge stability, optical density (O.D.) of the formed recording image, image uniformity, and fixing property based on the following criteria.

Discharge Stability

Recording images formed on non-coated paper were visually evaluated based on the following criteria:

AA: every solid image does not include a portion not being printed (blur of recording image);

A: though solid images on and after the second line do not include a portion not being printed, the solid image on the first line slightly includes a portion not being printed;

B: solid images on and after the second line also slightly include a portion not being printed;

C: every solid image includes a portion not being printed; and

D: every solid image is hardly printed.

Image Density

The optical density (O.D.) of the solid portion of each of the recording images formed on non-coated paper with black inks was measured with a densitometer (Macbeth RD915, manufactured by Macbeth Company) and was evaluated based on the following criteria:

A: 1.20 or more,

B: 1.10 or more and less than 1.20,

C: less than 1.10, and

-: not capable of printing.

Image Uniformity for Non-coated Paper

The solid portions of recording images formed on non-coated paper were visually evaluated based on the following evaluation criteria:

A: uniform, and no unevenness is observed,

B: slight unevenness is observed,

C: distinct unevenness is observed, and

-: not capable of printing.

Image Uniformity for Coated Paper

Recording images (each 3 cm×3 cm) having a duty of 10% were formed on coated paper (OK Topcoat+, manufactured by Oji Paper Co., Ltd.) with the above-described ink-jet recording apparatus, and uniformity of the recording images was visually evaluated based on the following evaluation criteria:

A: uniform, and no unevenness is observed,

B: slight unevenness is observed,

C: distinct unevenness is observed, and

-: not capable of printing.

Scratch Resistance

Lens-cleaning paper was pressed onto the solid portions of recording images printed on coated-paper, and the degree of transfer of the ink to the lens-cleaning paper was visually evaluated based on the following evaluation criteria:

A: no transfer is observed,

B: slight transfer is observed, and

C: distinct transfer is observed.

The evaluation results of the black inks (Examples 1 to 12, Comparative Examples 1 to 6) are shown in Table 5, and the evaluation results of the color inks (Examples 13 to 24, Comparative Examples 7 to 12) are shown in Table 6.

TABLE 5

| | | | | | Image uniformity | | |
|---|---|---|---|---|---|---|---|
| | Black ink No. | Dispersion stability | Discharge stability | Image density | Non-coated paper | Coated paper | Scratch resistance |
| Example 1 | 1 | A | A | AA | A | A | A |
| Example 2 | 2 | A | AA | B | A | A | A |

TABLE 5-continued

| | Black ink No. | Dispersion stability | Discharge stability | Image density | Image uniformity Non-coated paper | Image uniformity Coated paper | Scratch resistance |
|---|---|---|---|---|---|---|---|
| Example 3 | 3 | A | AA | AA | A | A | A |
| Example 4 | 4 | A | AA | AA | A | A | A |
| Example 5 | 5 | A | AA | AA | A | A | A |
| Example 6 | 6 | A | AA | A | A | A | A |
| Example 7 | 7 | A | AA | AA | A | A | A |
| Example 8 | 8 | A | AA | AA | A | A | A |
| Example 9 | 9 | A | AA | AA | A | A | A |
| Example 10 | 10 | A | AA | AA | A | A | A |
| Example 11 | 11 | A | AA | AA | A | A | A |
| Example 12 | 12 | A | AA | AA | A | A | A |
| Comparative Example 1 | 13 | A | D | — | — | — | — |
| Comparative Example 2 | 14 | B | B | A | C | C | A |
| Comparative Example 3 | 15 | A | B | B | B | B | B |
| Comparative Example 4 | 16 | B | AA | AA | A | A | A |
| Comparative Example 5 | 17 | A | C | — | — | — | — |
| Comparative Example 6 | 18 | A | D | — | — | — | — |

TABLE 6

| | Color ink No. | Dispersion stability | Discharge stability | Image uniformity Non-coated paper | Image uniformity Coated paper | Scratch resistance |
|---|---|---|---|---|---|---|
| Example 13 | 1 | A | A | A | A | A |
| Example 14 | 2 | A | AA | A | A | A |
| Example 15 | 3 | A | AA | A | A | A |
| Example 16 | 4 | A | AA | A | A | A |
| Example 17 | 5 | A | AA | A | A | A |
| Example 18 | 6 | A | AA | A | A | A |
| Example 19 | 7 | A | AA | A | A | A |
| Example 20 | 8 | A | AA | A | A | A |
| Example 21 | 9 | A | AA | A | A | A |
| Example 22 | 10 | A | AA | A | A | A |
| Example 23 | 11 | A | AA | A | A | A |
| Example 24 | 12 | A | AA | A | A | A |
| Comparative Example 7 | 13 | A | D | — | — | — |
| Comparative Example 8 | 14 | B | B | B | C | A |
| Comparative Example 9 | 15 | A | B | B | B | B |
| Comparative Example 10 | 16 | B | AA | A | A | A |
| Comparative Example 11 | 17 | A | C | — | — | — |
| Comparative Example 12 | 18 | A | D | — | — | — |

It is recognized from Table 5 that the inks of Examples 1 to 12 are excellent in dispersion stability, discharge stability, image density, image uniformity, and scratch resistance, compared to the inks of Comparative Examples 1 to 6. It is recognized from Table 6 that the inks of Examples 13 to 24 are excellent in dispersion stability, discharge stability, image uniformity, and scratch resistance, compared to the inks of Comparative Examples 7 to 12. These results are probably due to that the resins contained in the inks of Examples have glass transition temperatures of 25° C. or more, average particle diameters of 70 nm or more and 220 nm or less, and acid values of 25 mg KOH/g or more and 150 mg KOH/g or less.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-019955 filed Feb. 1, 2011, which is hereby incorporated by reference herein in its entirety.

What is claimed is:

1. An ink-jet recording method comprising:

applying an ink to a recording medium by discharging the ink from a recording head by action of thermal energy; and fixing the ink to the recording medium by heating the ink applied to the recording medium, wherein the ink contains water, a self-dispersing pigment, and resin particles, wherein the resin particles have a glass transition temperature of not less than 25° C., an average particle diameter of 70 nm or more and 220 nm or less, and an acid value of 25 mg KOH/g or more and 150 mg KOH/g or less.

2. The ink-jet recording method according to claim 1, wherein the ink contains either an inorganic acid salt or an organic acid salt.

3. The ink-jet recording method according to claim 1, wherein the heating the ink for fixing the ink to the recording medium is performed at a temperature of not less than the glass transition temperature of the resin particles.

4. The ink-jet recording method according to claim 1, wherein the content of the resin particles in the ink is 10.0% by mass or more based on the content of the self-dispersing pigment.

5. The ink-jet recording method according to claim 1, wherein the content of the resin particles in the ink is 30.0% by mass or less based on the total amount of the ink.

6. The ink-jet recording method according to claim 1, wherein the ink further comprises trimethylolpropane.

7. The ink-jet recording method according to claim 6, wherein the ink further comprises 1,2-hexanediol or 1,6-hexanediol.

8. The ink-jet recording method according to claim 1, further comprising an aggregation solution applying process applying the aggregation solution containing a coagulant for aggregating the self-dispersing pigment in the ink to the recording medium.

* * * * *